March 20, 1928.
W. E. WEBB ET AL
TAG
Filed April 1, 1927
1,663,185
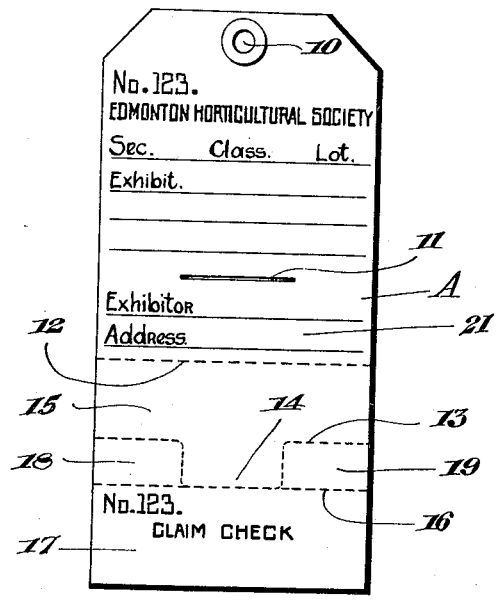
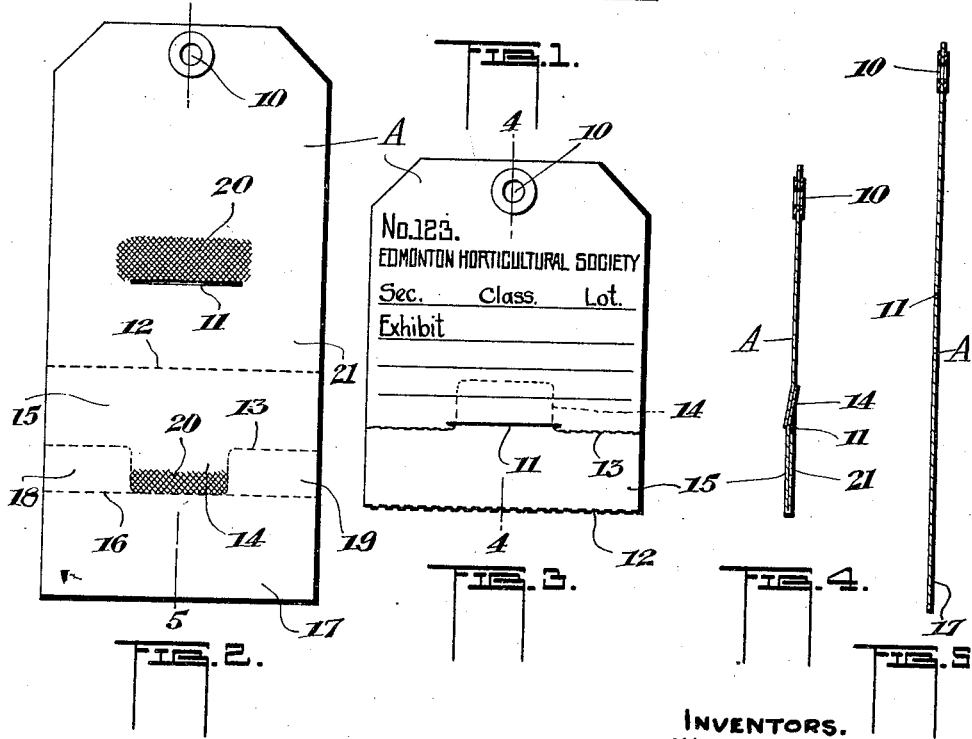
INVENTORS.
WILLIAM E. WEBB.
ERNEST P. WILLIAMS.
BY Featherstonhaugh & Co.
ATT'YS.

Patented Mar. 20, 1928.

1,663,185

UNITED STATES PATENT OFFICE.

WILLIAM EDWARD WEBB AND ERNEST PENROSE WILLIAMS, OF EDMONTON, ALBERTA, CANADA.

TAG.

Application filed April 1, 1927. Serial No. 180,257.

This invention relates to improvements in tags and the objects of the invention are to provide a tag for marking goods particularly adapted for use in marking goods at exhibitions where the name of the exhibitor is kept secret during the judging of the exhibits prior to the awarding of prizes.

With these and other objects in view the invention consists of a tag formed with a partially extending cross slot substantially midway thereof, a line of partial perforations spaced from and below the slot, a second line of partial perforations spaced from and below the first mentioned line and of substantially U shape to provide a tongue or flap, a third transverse line of partial perforations parallel and spaced to form the U-shaped line and integral with the bottom of the U, forming a check portion adapted to be detached, the perforated portions on each side of the U being detachable to complete the tongue whereby, on the tongue carrying portion being folded, the tongue will engage with the slot, and adhesive means on the back of the tag for retaining the tongue in locked engagement therewith.

Referring now to the drawings in which like characters of reference indicate corresponding parts in each figure.

Figure 1 is a front elevation of the improved tag

Figure 2 is an elevation of the back of the tag

Figure 3 is a front view of the tag folded

Figure 4 is a section on the line 4—4 of Figure 3

Figure 5 is a section on the line 5—5 of Figure 2

Referring now more particularly to the drawings, in which a preferred example of our invention is disclosed, A designates the tag or label as a whole of any suitable material and shape and provided adjacent one end with an opening 10 to engage with means for attaching the tag. Substantially midway in the tag is a transversely and partially extending slot 11. Spaced from this slot is a transversely extending and partially perforated line 12 and spaced from the line 12 is a partially perforated circular U-shaped transversely extending line 13, the circular U-shaped portion being adapted to form a tongue or flap 14. Integral with the foldable middle portion 15 formed by the two partially perforated lines 12 and 13 is the partially perforated line 16 spaced from the line 13 and in contacting proximity to the tongue shaped portion, providing a bottom or check portion 17 to be detached. When this portion 17 is removed the portions 18 and 19 between the perforated line 16 and the perforated U-shaped line 13 are removed leaving the tongue shaped portion 14. The foldable portion 15 is then folded upwardly, the tongue 14 registering with the slot 11 and bent to extend therethrough (see dotted lines Figure 3). For securely retaining the tongue in engagement with this slot so that the indicia or writing on the fold of the slotted portion will be kept covered and thus secret, an adhesive 20 is provided on the back of the tag and on the back of the tongue, to stick and retain both firmly together.

The example of our invention disclosed is shown as adapted for marking exhibits at exhibitions, the top of the tag having the particulars as to number, name of the association or exhibition, and ruled therebeneath under headings for section, class and lot, providing for a description of the exhibit. Beneath the slot 11 are ruled spaced lines for the name and address of the exhibitor which is to be kept secret until the prizes are awarded and the portion containing the information, designated by the numeral 21, is, as described, covered by detaching the bottom or claim check portion 17 which is taken away, detaching the portions 18 and 19 and then folding the tongue carrying portion 15 so that the tongue or flap 14 will engage with the slot 11, and then further securing the tongue by sticking it to the back of the tag.

It will thus been seen from the foregoing that the name and address or other information on the tag that is intended to be kept secret can be readily covered and kept covered without in any way smudging or obliterating such information and that when it is desired to disclose the information so covered it is only necessary to insert the finger beneath the tongue portion and break it when the folded cover portion of the tag will be immediately released to disclose what has been concealed.

From the foregoing it will be seen that the tag is divided into three panels or portions as follows:—A main panel 21 with a slot 11 therein, a tongue carrying foldable or middle panel 15, and a detachable panel 17. The main panel is designed, in the example here shown, to carry information as to the exhibit, etc., the name and address of the exhibitor, the middle or foldable tongue carrying panel 15 being adapted to fold over and conceal the latter while leaving clear the greater portion of the main panel, the detachable panel being here shown in the form of a claim check.

As many changes could be made in the above construction and many apparently widely different embodiments of our invention, within the scope of the claims, constructed, it is intended that all matter contained in the accompanying specification and drawings shall be interpreted as illustrative and not in a limiting sense.

What we claim as our invention is:—

1. An entry tag of the character described comprising a main panel having a slot therein, a middle panel separated from the main panel by a weakened line, an irregular weakened line spaced from the aforementioned weakened line to provide the middle panel with a tongue, and a weakened line between the tongue and the lower panel whereby on the lower panel being detached and the tongue and middle panel folded the tongue on the middle panel engages with the slot in the main panel.

2. A tag comprising a main panel having a slot therein, a middle panel provided with a tongue and separated from the main panel by a weakened line, a third panel separated from the middle panel by a weakened line whereby on the third panel being detached and the middle panel folded the tongue engages with the slot in the main panel to retain the middle panel folded on itself, and adhesive means for the tongue and the slot.

3. A tag of the character described comprising three panels, a main panel having a slot therein, a middle foldable panel, and a lower detachable panel, weakened lines dividing said panels, a tongue on the middle panel adapted on the lower panel being detached and the middle panel folded to engage with the slot in the main panel.

4. A tag of the character described comprising three panels, a main panel having an opening therein, a middle foldable panel and a lower detachable panel, and weakened line means separating said panels, an extension formed on the middle panel adapted on the lower panel being detached and the middle panel folded to engage with the slot in the main panel.

5. A tag of the character described comprising three panels, a main panel having a slot therein, a middle foldable panel, and a lower detachable panel, weakened lines dividing said panels, a tongue on the middle panel adapted on the lower panel being detached and the middle panel folded to engage with the slot in the main panel, and adhesive means associated with the slot for sealing the tongue in engagement therewith.

In witness whereof we have hereunto set our hands.

WILLIAM EDWARD WEBB.
ERNEST PENROSE WILLIAMS.